Oct. 15, 1963 J. B. CHATTEN 3,107,275

CONTROL OF CHROMA CHANNEL BY LOW INTENSITY BRIGHTNESS SIGNALS

Filed Aug. 10, 1960

INVENTOR.
JOHN B. CHATTEN

BY
Fordyce A. Bothwell
ATTORNEY

United States Patent Office 3,107,275
Patented Oct. 15, 1963

3,107,275

CONTROL OF CHROMA CHANNEL BY LOW INTENSITY BRIGHTNESS SIGNALS

John B. Chatten, Philadelphia, Pa., assignor, by mesne assignments, to Philco Corporation, Philadelphia, Pa., a corporation of Delaware Filed Aug. 10, 1960, Ser. No. 48,754
11 Claims. (Cl. 178—5.4)

This invention relates to color television systems and more particularly to the prevention of certain noise effects which tend to degrade the picture in such systems.

As is well understood in the art, a composite color television signal comprises a monochrome signal which represents monochrome information of the object or scene being televised and a chroma signal which represents the color information of the object or scene. These component signals may be separated and passed through separate channels, as they are for example at the receiver.

It has been observed that one of the most objectionable defects in color television pictures is the effect produced by noise passing through the chroma channel which is particularly noticeable during reproduction of black or near-black portions of the object or scene being televised. Such noise appears as scintillation in the picture. This is particularly noticeable in the case of a color television receiver employing an index-type picture tube which requires that there always be some beam current, even during black portions of the picture, to ensure the continuous production of an index signal.

The principal object of the present invention is to overcome this objection.

In accordance with this invention, provision is made for attenuating transfer in the chroma channel whenever the monochrome signal is representative of a substantially black area of the object or scene being televised. While this invention is applicable to any part of a color television system where the monochrome and chroma signals may be separated and passed through two channels, it is especially well suited for application to the monochrome and chroma channels of a color television receiver.

Figure 1:
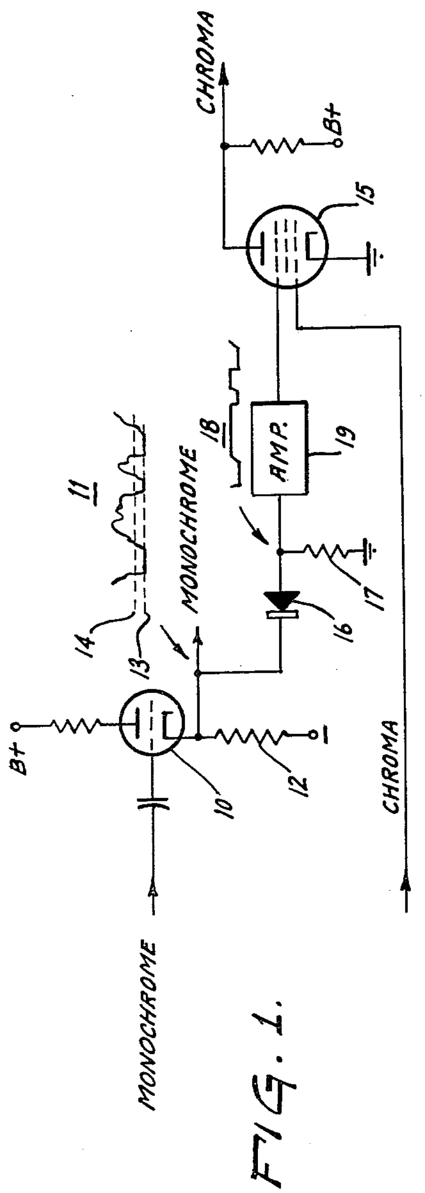
Figure 2:
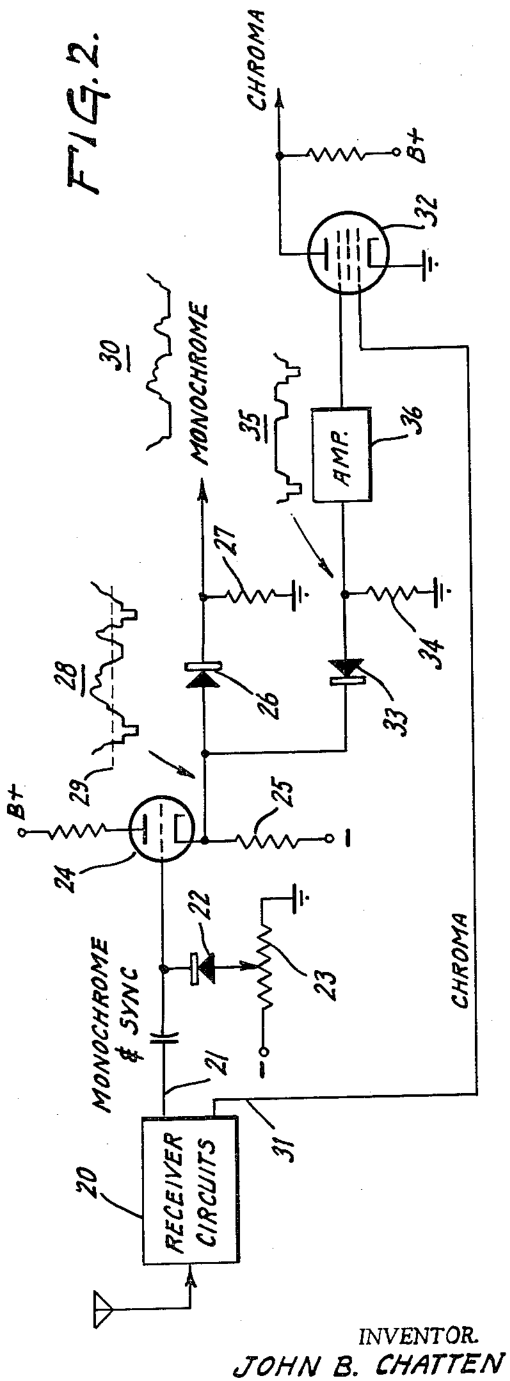

The invention may be fully understood from the following detailed description with reference to the accompanying drawing wherein FIG. 1 is a diagrammatic illustration showing the application of the invention generally to a color television system; and FIG. 2 is a diagrammatic illustration showing the application of the invention to a color television receiver.

Referring first to FIG. 1, the illustration therein is intended to represent any part of a color television system where the monochrome and the chroma signals are separated and are supplied to different channels. Thus in the illustration the monochrome signal is supplied to a monochrome channel including tube 10 which in this instance is connected as a cathode follower. The monochrome signal is supplied to the control grid of tube 10. The same signal, represented at 11, appears across the cathode resistor 12. The black level of said signal is represented at 13. For the purpose of this invention, a threshold 14 is established in the vicinity of said black level by a bias voltage applied to the lower end of resistor 12.

The chroma signal is supplied to a chroma channel including a multi-grid gating tube 15. As illustrated the chroma signal is supplied to the control grid of the gating tube. Normally, tube 15 transfers the chroma signal without attenuation to its output circuit.

A diode 16 and its load resistor 17 are connected as shown to derive a negative-going control signal from the monochrome channel whenever the monochrome signal 11 crosses the threshold 14. The control signal, represented at 18, appears across resistor 17 and is amplified by an amplifier 19 and is applied to a grid of the gating tube 15. The control signal reduces the conductivity of tube 15 and it thus attenuates transfer in the chroma channel. It will be appreciated that this requires that the negative-going polarity of the control signal 18 be maintained, and therefore the polarity of the control signal should not be reversed in the amplifier 19. For example, this amplifier may be a two-stage amplifier so as to maintain the negative polarity of the control signal.

Thus whenever the monochrome signal 11 is representative of a substantially black area of the object or scene being televised, a control signal is derived from the monochrome channel and is utilized to attenuate transfer in the chroma channel. This reduces noise transmission in the chroma channel sufficiently so that the picture is not adversely affected.

If desired, the control signal can be caused to blank the chroma channel so as to reduce transmission therein to zero. This merely requires that the control signal be amplified sufficiently to gate tube 15 completely off.

Referring now to FIG. 2, there is shown by way of example, an application of this invention to a color television receiver. Block 20 represents the receiver circuits by which the component signals of the received composite color television signal are derived. At output connection 21 there is derived a composite signal comprising the monochrome and synchronizing components which are of opposite polarities with respect to the black level, the monochrome component being positive with respect to said level. This composite signal is supplied to the monochrome channel which includes a D.C. restorer comprising diode 22 and potentiometer 23, a cathode follower stage comprising tube 24 and resistor 25, and a clipper comprising diode 26 and resistor 27. The composite monochrome and sync signal appearing across resistor 25 is shown at 28. A threshold 29 near the black level is established by a bias voltage applied to the lower end of resistor 25. The clipper effectively removes the portion of the composite signal below the threshold 29. The resulting signal, which is supplied to the picture tube, is represented at 30.

The chroma signal is derived from the receiver circuits 20 at output connection 31 and is supplied to the chroma channel which includes a multi-grid gating tube 32. As shown, the chroma signal is supplied to the control grid of the gating tube.

A second clipper, comprising diode 33 and resistor 34, is connected to the monochrome channel as shown to derive a negative-going control signal whenever the composite signal 28 crosses the threshold 29. The control signal, represented at 35, is amplified in amplifier 36 and is applied to a grid of the gating tube 32. The control signal reduces the conductivity of tube 32 and it thus attenuates transfer in the chroma channel. Here again, the amplifier 36 should not reverse the polarity of the control signal which is required to be negative.

Thus whenever the monochrome component of signal 28 is representative of a substantially black area of the object or scene being televised, a control signal is derived from the monochrome channel and is utilized substantially to attenuate transfer in the chroma channel. This reduces noise transmission in the chroma channel sufficiently so that the picture is not adversely affected. If desired, of course, the control signal can be caused to blank the chroma channel completely.

While certain embodiments of the invention have been illustrated and described, it will be understood, of course, that the invention is not limited thereto but contemplates such modifications and further embodiments as may occur to those skilled in the art.

I claim:

1. In a color television system wherein picture information is represented by monochrome and chroma signals, a monochrome channel through which said monochrome signal is transferred, a chroma channel through which said chroma signal is transferred, and means for attenuating transfer in said chroma channel whenever said monochrome signal is representative of a substantially black area of the object or scene being televised.

2. In a color television system wherein picture information is represented by monochrome and chroma signals, a monochrome channel through which said monochrome signal is transferred, a chroma channel through which said chroma signal is transferred, means for deriving a control signal from said monochrome channel whenever said monochrome signal is representative of a substantially black area of the object or scene being televised, and means for utilizing said control signal to attenuate transfer in said chroma channel.

3. In a color television system wherein picture information is represented by monochrome and chroma signals, a monochrome channel through which said monochrome signal is transferred, a chroma channel through which said chroma signal is transferred, a gating amplifier in said chroma channel, means for deriving a control signal from said monochrome channel whenever said monochrome signal is representative of a substantially black area of the object or scene being televised, and means for applying said control signal to said amplifier so as to attenuate transfer in said chroma channel.

4. In a color television system wherein picture information is represented by monochrome and chroma signals, a monochrome channel through which said monochrome signal is transferred, a chroma channel through which said chroma signal is transferred, means in said monochrome channel for establishing in the vicinity of the black-representative level of said monochrome signal a threshold which the monochrome signal must cross to reach said level, means for deriving a control signal from said monochrome channel whenever said monochrome signal crosses said threshold and becomes representative of a substantially black area of the object or scene being televised, and means for utilizing said control signal to attenuate transfer in said chroma channel.

5. In a color television system, a monochrome channel to which there is supplied a composite signal comprising monochrome and sync components of opposite polarities with respect to a level representing black, a chroma channel to which there is supplied a chroma signal, means in said monochrome channel for establishing a threshold representing a level of said monochrome component in the vicinity of said black-representative level, so that the monochrome component must cross said threshold to reach said black-representative level, means for deriving a control signal from said monochrome channel whenever said monochrome component crosses said threshold and becomes representative of a substantially black area of the object or scene being televised, and means for utilizing said control signal to attenuate transfer in said chroma channel.

6. In a color television receiver, a monochrome channel, means for supplying to said channel a signal representative of the monochrome information of a received color television signal, a chroma channel, means for supplying to said chroma channel a signal representative of the color information of the received color television signal, and means for attenuating transfer in said chroma channel whenever said first signal is representative of a substantially black area of the object or scene being televised.

7. In a color television receiver, a monochrome channel, means for supplying to said channel a signal representative of the monochrome information of a received color television signal, a chroma channel, means for supplying to said chroma channel a signal representative of the color information of the received color television signal, means for deriving a control signal from said monochrome channel whenever said first signal is representative of a substantially black area of the object or scene being televised, and means for utilizing said control signal to attenuate transfer in said chroma channel.

8. In a color television receiver, a monochrome channel, means for supplying to said channel a signal representative of the monochrome information of a received color television signal, a chroma channel, means for supplying to said chroma channel a signal representative of the color information of the received color television signal, a gating amplifier in said chroma channel, means for deriving a control signal from said monochrome channel whenever said first signal is representative of a substantially black area of the object or scene being televised, and means for applying said control signal to said amplifier so as to attenuate transfer in said chroma channel.

9. In a color television receiver, a monochrome channel, means for supplying to said channel a signal representative of the monochrome information of a received color television signal, a chroma channel, means for supplying to said chroma channel a signal representative of the color information of the received color television signal, means in said monochrome channel for establishing in the vicinity of the black-representative level of said first signal a threshold which said first signal must cross to reach said level, means for deriving a control signal from said monochrome channel whenever said first signal crosses said threshold and becomes representative of a substantially black area of the object or scene being televised and means for utilizing said control signal to attenuate transfer in said chroma channel.

10. In a color television receiver, a monochrome channel, means for supplying to said channel a composite signal comprising monochrome and sync components of opposite polarities with respect to a level representing black, a chroma channel, means for supplying a chroma signal to said chroma channel, means in said monochrome channel for establishing a threshold representing a level of said monochrome component in the vicinity of said black-representative level, so that the monochrome component must cross said threshold to reach said black-representative level, means for deriving a control signal from said monochrome channel whenever said monochrome component crosses said threshold and becomes representative of a substantially black area of the object or scene being televised, and means for utilizing said control signal to attenuate transfer in said chroma channel.

11. In a color television receiver, a monochrome channel, means for supplying to said channel a composite signal comprising monochrome and sync components of opposite polarities with respect to a level representing black, a chroma channel, means for supplying a chroma signal to said chroma channel, means in said monochrome channel for establishing a threshold representing a level of said monochrome component in the vicinity of said black-representative level, means for clipping from said composite signal the portions including sync components which cross said threshold, thereby to derive only the monochrome component, means for deriving a control signal from said monochrome channel whenever said monochrome component crosses said threshold, and means for utilizing said control signal to attenuate transfer in said chroma channel.

References Cited in the file of this patent

UNITED STATES PATENTS 2,866,846 Smith ---------------- Dec. 30, 1958